C. B. Burnap,
Bending Wood.
N° 10,056.    Patented Sep. 27, 1853.
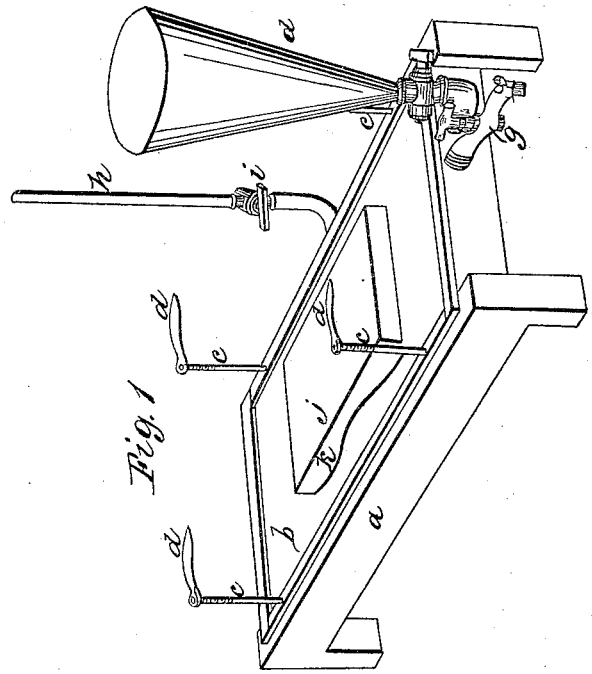
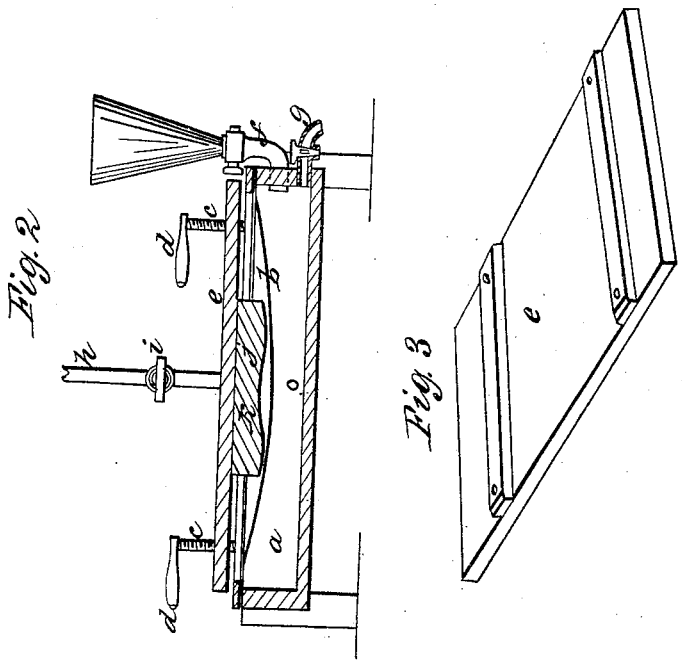

UNITED STATES PATENT OFFICE.

CALEB B. BURNAP, OF HARTFORD, CONNECTICUT, ASSIGNOR TO L. F. ROBINSON.

METHOD OF VENEERING.

Specification of Letters Patent No. 10,056, dated September 27, 1853.

*To all whom it may concern:*

Be it known that I, CALEB B. BURNAP, of Hartford, Connecticut, have invented an Improvement in the Method of Veneering Surfaces, of which the following is a full, clear, and exact description, reference being had to the accompanying drawings, making part of this specification, in which—

Figure 1, is a perspective view of the apparatus. Fig. 2, a longitudinal vertical section thereof, and Fig. 3, a separate view of the cap removed in Fig. 1.

Same letters indicate like parts in all the figures.

The object of my invention is to make a more perfect and equal pressure on the surface of veneers, in gluing or cementing them, than can be obtained by any other plan heretofore known to me.

In gluing or cementing veneers on surfaces whether flat or curved, as heretofore practised, serious difficulties have been experienced. If the veneer be not of perfectly uniform thickness, or the surface making pressure thereon be not perfectly parallel with the surface to be veneered, the two surfaces to be united will not be brought together with equal force, and hence the union will be imperfect; and even when these defects are avoided, the glue or cement must be spread on with great care and uniformity, or the union will be imperfect, the parts having the most glue receiving the greatest pressure. And when the surface is large, numerous clamps must be used, which requires much time and labor, the clamps making greater pressure immediately under each clamp, than between, where the veneer is liable to blister—as it is termed—that is, separate from the surface veneered which in some cases requires the whole veneer to be taken off and renewed; always to be re-heated and re-pressed. But the most serious objection to the modes heretofore practised, is to be found in the difficulty and expense of making and keeping on hand in the shops, molds or forms called cauls suited to all the various forms of surfaces to be veneered, for the molds or cauls for making pressure on the veneers must be perfect counterparts of the surfaces to be veneered, which cannot be preserved by reason of warping. Various attempts have been made to remedy some of the difficulties above enumerated, by making the molds or cauls in jointed segments to adapt themselves to the varying curvatures of the surfaces to be veneered, or by making pressure on the veneers by means of sand or other granular substances. The objections to the first of these, are expense of construction, liability to derangement, and although molds thus made will adapt themselves to the general configurations, the surface of each segment will present to the extent of its surface, the defect of solid and single molds or cauls. And the latter is defective for the reason that grains of sand and other granular substances, when subjected to pressure, do not possess that perfect mobility among themselves which is necessary to make equal pressure on the entire surface, and besides this, it is difficult to confine such substances to the surfaces of the veneers when subjected to pressure.

The object of my invention is to make a uniform and self adapting pressure to the surface of veneers in gluing them on whatever may be the form of the surface and at the same time to heat the veneers, to facilitate the gluing or cementing.

The nature of my invention consists in pressing veneers on the surfaces to be veneered, by means of a fluid acting on a flexible substance interposed and making part of a vessel containing or into which the fluid is to be forced, by means of which the pressure becomes self adapting to all forms, making equal or nearly equal pressure on every part of the veneer irrespective of the configuration. And my invention also consists in using the fluid employed to make pressure on the veneers through the medium of the flexible substance, in a heated state, for keeping the glue warm, when the pressure is first applied, that it may run freely and spread evenly over the surface under the action of the pressure, and thus hasten the drying while the pressure is continued.

In the accompanying drawings, *a* represents a box or other vessel which may be of any desirable form, and sufficiently strong and tight to hold water. The bottom and sides of this box may be made of metal or wood or other substance, and the top *b* is formed of a sheet of vulcanized india rubber, or other flexible waterproof substance firmly attached all around to the upper edges of the box. This flexible sheet should be loose that it may bend or yield to the curvatures of a surface applied to it. And the edges of the box are provided with vertical screws *c c c c* with hand nuts *d* for the purpose of holding down and securing a cap plate *e*, or if desired, to force it down onto the flexible sheet *b*. The box is provided with a pipe *f* with a stop cock, and surrounded with a funnel for introducing water into the box. There is also a discharge pipe and stop cock *g* for emptying the box, and also a third pipe *h*, called the pressure pipe, with a stop cock *i*. This pipe can be connected with a head of water or with a force pump for forcing water into the box.

The box having been filled with hot water through the funnel, the block *j* to be veneered, properly coated with glue or other cement, and the veneer *k* applied, is put onto the flexible cloth *b* with the veneer on the cloth. The cap plate *e* is then put over the block *j* and secured with the nuts, and then water is forced in through the pressure pipe until the required pressure is obtained, and the veneer is forced in contact with every part of the surface to be veneered. This pressure is continued until the glue is set or dry, or a stop cock in the pressure pipe can be closed and the apparatus laid by until the glue is dry, which drying operation will be hastened by the heat of the water introduced.

It will be obvious from the foregoing that instead of hot water, other fluid may be substituted, such as heated air or steam of high pressure, but this latter would be inconvenient from the necessity of keeping the apparatus in connection with a boiler, until the glue is dry, or making the box of metal, kept at the required temperature to maintain the tension of the steam.

If water or other fluid be used, instead of a force pump, the pressure of column may be substituted. Or, instead of forcing in the fluid, whether liquid or gaseous, after the vessel has been filled, the block to be veneered can be forced against the flexible cloth by means of screws or their mechanical equivalents. And finally, it will be obvious, that, if desired, the fluid can be applied in the cold state, as the medium of pressure, although I prefer to apply it in the heated state.

What I claim as my invention and desire to secure by Letters Patent is—

The method of pressing veneers onto surfaces to which they are to be glued or cemented, by means of a fluid, hot or cold, acting on an interposed flexible substance, such as an india rubber cloth or its equivalent, which will adapt itself to the surfaces, substantially as described.

CALEB B. BURNAP.

Witnesses:
HENRY KELLOGG,
GEO. S. GILMAN.